Patented Mar. 18, 1952

2,589,237

UNITED STATES PATENT OFFICE 2,589,237

VINYL CHLORIDE-ALLYL GLYCIDYL ETHER COPOLYMERS

Ellsworth Knowlton Ellingboe, Wilmington, Del., assignor to E. I. du Pont de Nemours and Company, Wilmington, Del., a corporation of Delaware No Drawing. Application August 25, 1950, Serial No. 181,583

2 Claims. (Cl. 260—87.5)

This invention relates to polymeric materials and, more particularly, to certain new thermosetting polymers.

Many coating or molding compositions based on vinyl chloride polymers and copolymers have been described and some have achieved commercial success. However, in spite of their economic and technical advantages, the prior compositions leave much to be desired in respect to certain important properties such as initial solubility, final film insolubility and nonthermoplasticity, heat resistance, and hardness. In particular, the vinyl chloride polymer compositions heretofore known are not readily amenable to heat-curing (i. e., insolubilization upon heat treatment) and they lack thermal stability, as evidenced by the embrittlement, discoloration, and general decomposition they undergo when subjected to heat and/or light.

The above effects in vinyl chloride polymer compositions have been recently overcome by copolymerizing vinyl chloride with allyl glycidyl ether and a third polymerizable component which can be an allyl ether of a hydroxyalkanoic acid, e. g., allyl beta-hydroxypropionate (application Ser. No. 160,581 filed by E. K. Ellingboe on May 6, 1950 and now Patent 2,562,897 issued August 7, 1951) or an allyl ether of a hydroxyalkanoic acid, e. g., allyloxyacetic acid (application Ser. No. 170,704, filed by E. K. Ellingboe and H. S. Rothrock on June 27, 1950 and now abandoned). While these particular three-component copolymers have solved the problems outlined above, they are not completely free of practical disadvantages since the third components are somewhat costly and, moreover, introduce additional difficulties in the control of the polymerization processs.

An object of the present invention is to provide a new film-forming, heat-curable copolymer. A further object is to provide such a copolymer comparable in properties to the aforementioned three-component copolymers but more economical with respect to the starting monomeric ingredients and more readily prepared. Other objects will be apparent from the description of the invention given hereinafter.

The above objects are accomplished according to the present invention by providing copolymers, the polymeric components of which essentially consist of, by weight, 75% to 85% of polymerized vinyl chloride and 15% to 25% of polymerized allyl glycidyl ether, the copolymers having a viscosity, in 30% cyclohexanone solution at 25° C., between about 1.3 and about 3 poises.

In a more preferred form, the proportion, by weight, of the polyvinyl chloride in the copolymers of this invention is between 78% and 82%, and that of the allyl glycidyl ether is between 18% and 22%, and the viscosity, in 30% cyclohexanone solution at 25° C., is between 1.4 and 2 poises.

It has now been unexpectedly found that when vinyl chloride and allyl glycidyl ether are polymerized, in the absence of an added polymerizable allylic monomer, to copolymers within a specific, narrow range of proportions and molecular weight (as indicated by solution viscosity) as defined above, the products so obtained exhibit the optimum combination of initial solubility, heat-curability, stability, film toughness, film flexibility and solvent resistance for use in coating compositions. This discovery was all the more surprising since the sole and very incomplete suggestion of vinyl chloride/allyl glycidyl ether copolymers in the chemical literature (U. S. Patent 2,470,324) would not lead one to expect that the above-mentioned advantages could be achieved in a copolymer of vinyl chloride/allyl glycidyl ether by proper selection of proportions and molecular weight.

The invention is illustrated in greater detail in the following examples, in which parts are by weight unless otherwise noted.

Example I

A stainless steel reactor was swept with oxygen-free nitrogen and charged with 180 parts of allyl glycidyl ether, 262 parts of thiophene-free benzene, 6 parts of alpha, alpha'-azodiisobutyronitrile, and 0.6 part of maleic anhydride. The reactor was then evacuated to a pressure of 90–100 mm., closed, cooled in a solid carbon dioxide/acetone bath and charged with 420 parts of vinyl chloride introduced by distillation. The reactor was heated at 60° C. and maintained at that temperature for 12 hours with agitation, the maximum internal pressure being 70 lbs./sq. in. After cooling to room temperature and releasing the residual pressure, the benzene solution of the reaction product was poured into a 4- to 6-fold volume of methanol, whereupon the polymer coagulated. The polymer was separated, air-dried and redissolved in acetone. The acetone solution was poured into methanol and the reprecipitated polymer was filtered and dried under reduced pressure. There was obtained 118.5 parts of vinyl chloride/allyl glycidyl ether copolymer containing 78.9% vinyl chloride as calculated from its chlorine content of 44.8%.

Its viscosity in 30% cyclohexanone at 25° C. was 1.40 poises.

This copolymer showed superior heat and light stability on comparison with a commercial vinyl chloride/vinyl acetate copolymer when tested in the form of coatings of 1–2 mil thickness on phosphate-treated steel. On baking the vinyl chloride/allyl glycidyl ether copolymer coatings for 30 minutes at a temperature of 204° C., there was no evidence of disintegration, whereas the vinyl chloride/vinyl acetate copolymer coatings began to blacken when heated 30 minutes at 149° C. and were quite black and disintegrated in 30 minutes at 177° C.

The copolymer of this example had excellent initial solubility in solvents such as acetone, cyclohexanone or a 1:1 mixture of xylene and methyl isobutyl ketone. Upon baking at 149° C. for 30 minutes coatings of this copolymer blended with 0.3% by weight of zinc chloride or with a mixture of 0.2% by weight of tin (as $SnCl_2.2H_2O$) and 0.7% by weight of citric acid, there were obtained tough films insoluble in the above mentioned and other solvents. These films exhibited an outstanding combination of flexibility, heat stability, toughness and print resistance which made them uniquely suited for coatings in industrial or household uses.

*Example II*

Following the procedure of Example I, five copolymers were prepared using the same proportions of monomers and the same reaction conditions. The five copolymers contained the following percentages of polyvinyl chloride, respectively: 80.5%, 79.1%, 79.5%, 80.6%, and 79.7%, and they had the following viscosities in 30% cyclohexanone at 25° C., respectively: 1.53, 1.33, 1.65, 1.53 and 1.40 poises. All of these copolymers possessed outstanding inherent thermal stability, as shown by the fact that thin coatings on phosphate treated steel showed no evidence of discoloration or disintegration when heated at 204° C. for 30 minutes. Upon heat-curing as described in Example I, these copolymers showed the same superior combination of qualities as that of Example I.

Enamels containing 40% total solids were prepared from a vinyl chloride/allyl glycidyl ether copolymer mixture which was a blend of the polymer of Example I and of the five polymers of Example II, in equal portions of each. This blend contained 79.7% of polyvinyl chloride and had a viscosity of 1.47 poises in 30% cyclohexanone at 25° C. Enamels were prepared from 10 parts of the copolymer blend, 8 parts of rutile titanium dioxide pigments, 0.09 part of zinc chloride or a mixture of 0.036 part of tin (as $SnCl_2.2H_2O$) and 0.126 part of citric acid, and 28 parts of a mixture of equal parts of xylene and methyl isobutyl ketone. Coatings applied at 1–2 mil thickness over phosphatized steel and baked 30 minutes at 149° C. had a superior combination of properties, including gloss, color, flexibility, heat-stability, toughness, print-resistance at 93° C., and resistance to attack by organic solvents or hot soap solutions.

*Example III*

The sodium hydrazo-bismethanesulfonate used as the catalyst in this example was prepared as follows: To a solution of 157.5 parts of sodium bisulfite in 700 parts of distilled water was added 123 parts of 37% formaldehyde, then 44.5 parts of 85% hydrazine hydrate, whereupon the temperature of the reaction mixture rose to about 50° C. The reaction is represented by the equation:

$$2NaHSO_3 + 2HCHO + NH_2NH_2 \rightarrow NaO_3SCH_2NHNHCH_2SO_3Na + 2H_2O$$

After cooling to room temperature, the mixture was diluted to 1000 parts by volume by addition of distilled water. It contained then 20% of sodium hydrazo-bismethanesulfonate.

Each of eighteen similar glass pressure bottles was identically charged with materials and processed as follows: 7 parts of the 20% sodium hydrazo-bismethanesulfonate solution described above; 40 parts of distilled water containing 0.0157 part of copper sulfate hydrate, $CuSO_4.5H_2O$; 98 parts of 95% ethanol; and 15 parts of allyl glycidyl ether were charged into the bottle. The bottle was then flushed with oxygen-free nitrogen, cooled in solid carbon dioxide, and charged with 25 parts of vinyl chloride and 40 parts of 3% aqueous hydrogen peroxide. The bottle was then flushed with nitrogen and sealed. The contents of the sealed bottle were thoroughly mixed while being allowed to warm to room temperature, and thereafter agitated occasionally as the polymerization proceeded. The polymer began to form as a flocculent curdy precipitate at about −10° C. The polymerization was continued for two hours after the mixture reached room temperature. At the end of this time the reaction mixture was nearly solid and it had reached a temperature of about 40° C., due to the exothermic polymerization reaction. After cooling to about −25° C. the vessel was opened and its contents poured with stirring into 400 parts of methanol. The solid copolymer was filtered and washed thoroughly and successively with water containing about one part per thousand of concentrated hydrochloric acid, distilled water, and methanol. After compositing the eighteen runs and drying the reaction product at room temperature under reduced pressure, there was obtained 432 parts of vinyl chloride/allyl glycidyl ether copolymer. This material had a viscosity of 1.53 poises in 30% cyclohexanone at 25° C. It contained 79% of polyvinyl chloride, as shown by its chlorine content of 44.9%. It had the same excellent coating properties, both in clears and in enamels, as the polymers of the preceding examples.

It will be understood that the above examples are merely illustrative and that the present invention broadly comprises a copolymer, the polymeric components of which essentially consist of, by weight, 75% to 85% of polymerized vinyl chloride and 15% to 25% of polymerized allyl glycidyl ether, the copolymer having a viscosity, in 30% cyclohexanone solution at 25° C., between about 1.3 and about 3 poises.

The possession of the properties (initial solubility, final film insolubility and nonthermoplasticity, heat stability, hardness, toughness, and flexibility) which combine to make outstanding coatings, is rather strictly limited to copolymers falling within both the proportion and viscosity ranges stated above. Even relatively minor deviations in one or both requirements will give copolymers which may be satisfactory in many respects as candidates for coating materials but which are unsatisfactory in one or more of the properties recited above. The critical nature of this invention may be illustrated by the following:

(A) A vinyl chloride/allyl glycidyl ether copolymer was prepared using the monomer proportions and the procedure of Example I, except that the amount of alpha,alpha'-azodiisobutyronitrile catalyst was smaller (0.3%, based on the weight of polymerizable materials, instead of 1%) and the polymerization temperature was higher (65° C. instead of 60° C.). The copolymer so obtained had a polyvinyl chloride content of 78.1% but its molecular weight was lower than those of Examples I and II, as shown by a viscosity in 30% cyclohexanone solution at 25° C. of 1.18 poises. This copolymer had excellent inherent heat stability, as tested on coatings over phosphatized steel at 204° C., and films heat-cured as in Example I also had superior properties. However, when this copolymer was formulated into enamels as in Example II, the resulting films were deficient in flexibility after curing at 149° C. with zinc chloride or stannous chloride/citrus acid, and thus failed to show the outstanding combination of properties of the products of Examples I and II.

(B) A copolymer containing 83.7% of polyvinyl chloride but having a viscosity of 3.30 poises in 30% cyclohexanone at 25° C., was prepared by heating at 45° C. for 12 hours a mixture of 175 parts of vinyl chloride, 75 parts of allyl glycidyl ether and 2 parts of alpha,alpha'-azobis (alpha, gamma-dimethylvaleronitrile) in a reaction medium consisting of 87.5 parts of benzene and 100 parts of water. This copolymer showed poor thermal stability at 204° C. in thin coatings over phosphatized steel, although it gave good coatings when cured at 149° C. with 0.3% zinc chloride.

(C) A copolymer in the proper viscosity range (1.85 poises in 30% cyclohexanone at 25° C.) but containing 85.5% polyvinyl chloride was prepared as in (A) above except that the monomer mixture consisted of 80% vinyl chloride and 20% allyl glycidyl ether and there was used 1.2%, based on the weight of polymerizable material, of alpha,alpha'-azodiisobutyronitrile catalyst. This copolymer had very good thermal stability at 204° C. in thin coatings over phosphatized steel but, when formulated into enamels as in Example II, and cured at 149–163° C. with 0.5% zinc chloride, the coatings were deficient in flexibility and solvent resistance.

While the copolymers of this invention, in its broader phase, contain, by weight, between 75% and 85% of polyvinyl chloride and between 15% and 25% of polymerized allyl glycidyl ether, the preferred compositions contain between 78% and 82% of polyvinyl chloride and between 18% and 22% of polymerized allyl glycidyl ether. The compositions in which these copolymers are useful, may also comprise various extraneous non-polymerizable adjuvants such as dyes, pigments, reinforcing agents, fillers, plasticizers, stabilizers, oils, etc. Polymeric modifiers such as nondrying oil-modified alkyd resins, or various vinyl chloride copolymers, are especially useful.

The copolymers of this invention are prepared by polymerizing together and in suitable proportions vinyl chloride and allyl glycidyl ether. The vinyl chloride has a tendency to polymerize somewhat faster than the other component and, therefore, to appear in the polymer in somewhat greater proportion than in the monomeric mixture. While the actual composition of the copolymer depends on the conversion and the method of polymerization, there is usually from 5% to 10% more vinyl chloride in the polymer than in the monomer mixture or sometimes up to about 25% more, particularly when the low temperature polymerization initiators discussed below are used. As a general rule, copolymers within the desired range of proportions of the two components are obtained from monomer mixtures containing, by weight, from 60% to 80% of vinyl chloride and from 20% to 40% of allyl glycidyl ether.

The preferred polymerization initiators are those of the free radical-generating type such as organic or inorganic peroxides, e. g., hydrogen peroxide, benzoyl peroxide, lauroyl peroxide, tert.-butyl hydroperoxide, diethyl peroxide, and the like; or the per salts such as ammonium, potassium, or sodium persulfates, perborates, or percarbonates, with or without reducing adjuvants such as sulphur dioxide, sodium sulfite, sodium hydrosulfite, etc.; or the azo compounds described in U. S. Patent 2,471,959, e. g., the azonitriles such as alpha,alpha'-azodiisobutyronitrile; alpha,alpha'-azobis - (alpha,gamma - dimethylvaleronitrile); dimethyl alpha,alpha'-azodiisobutyrate; 1,1'-azodicyclohexanecarbonitrile and the like. The azonitrile initiators are preferred in the production of the copolymers of this invention since they give products having the best thermal stability.

Excellent initiators for use in aqueous systems are the following recently proposed combinations: a water-soluble metal thiocyanate with hydrogen peroxide or an organic hydroperoxide (as disclosed in application Ser. No. 138,525, filed by E. G. Howard on January 13, 1950); a salt of a hydrazobisalkanesulfonic acid, such as sodium hydrazobismethanesulfonate, with hydrogen peroxide and a cupric or ferric ion (as disclosed in application Ser. No. 141,867, filed by E. G. Howard on February 1, 1950); and thiourea with hydrogen peroxide (as disclosed in application Ser. No. 159,875, filed by E. G. Howard on May 3, 1950). These systems are effective at remarkably low temperatures, e. g., between —25° and +40° C. The catalyst need be used only in minor amounts, e. g., between 0.1 and 5% based on the weight of the total polymerizable materials. With azonitrile catalysts, a preferred amount is between 0.5 and 1.5%, based on the total polymerizable materials.

The polymerization can be carried out under a variety of conditions. While a solvent is not essential, it is convenient in practice to use a liquid medium which dissolves the monomers and catalyst. Any inert solvent can be used, including those which are also solvents for the polymer, e. g., aromatic hydrocarbons such as benzene, toluene, and the xylenes, or ketones such as acetone, methyl isobutyl ketone, cyclohexanone, etc., and those which do not dissolve the polymer, such as methanol, ethanol, butanol, tert.-butyl alcohol, acetic acid, aliphatic hydrocarbons, etc. Alternatively, the polymerization can be carried out in aqueous systems, with or without dispersing or emulsifying agents.

The polymerization mixture can include ingredients such as tert.-butyl or tert.-amyl alcohols which generally act as buffers in vinyl chloride polymerization to neutralize the hydrogen chloride which may be formed, or maleic anhydride which often confers better adhesive properties. However, these adjuvants are by no means necessary since allyl glycidyl ether itself acts as a buffer and since the allyl glycidyl ether/vinyl chloride copolymers themselves have excellent adhesive properties.

The reaction temperature is not critical, except to the extent that it may tend to affect the molecular weight of the polymer. As a general rule, an increase in polymerization temperature with a given initiator and a given vinyl chloride/allyl glycidyl ether ratio tends to decrease the molecular weight, i. e., the viscosity of the resulting polymer. At low temperatures, e. g., 0–10° C., the reaction is rather slow except when the low temperature initiators mentioned above are employed, in which case the reaction can be carried out even at temperatures as low as —25° C. It is usually expedient to operate at temperatures above 25° C. and preferably between 40 and 100° C. In view of the volatility of vinyl chloride, it is desirable to use sealed reactors. The reaction can be carried out under the autogenous pressure of the reactants at the reaction temperature but, if desired, additional pressure can be applied, e. g., vinyl chloride pressure, or that of an additional gaseous monomer such as ethylene, or that of an inert gas such as nitrogen.

The reaction product is obtained as a colorless or light-colored solid copolymer, which has the advantage of ready solubility in many common solvents, particularly in the aromatic mononuclear hydrocarbons and the aliphatic or alicylic ketones. These polymers can be cured, that is, rendered insoluble in the same solvents, by means of a heat treatment at temperatures between about 120° C. and 250° C. for periods varying, depending on the temperature, between 10 and 45 minutes. However, the heat-curing or thermosetting of the resins is preferably carried out with the aid of small amounts, from 0.1 to 5% by weight, of curing or thermosetting agents. A preferred curing agent is a combination of stannous chloride and citric acid, used in ratios of between about 0.1–0.3% of tin (as $SnCl_2.2H_2O$) and about 0.5–2% of citric acid.

With the help of such agents, it is possible to insolubilize the resins at lower temperatures, for example, by heating at 100 to 175° C. for 10 to 30 minutes; or, alternatively, at higher temperatures, such as 140–250° C., but in less time than is possible at the same temperature without a curing agent. After complete curing, the resins are substantially insoluble in and unaffected by the common solvents, including those, such as aromatic hydrocarbons or ketones, which dissolved them before the heat treatment.

The polymers of this invention are particularly useful in the coating and impregnating of porous surfaces such as textiles, e. g., cotton fabrics or regenerated cellulose fabrics, paper, wood, brick, etc., and in the coating of nonporous surfaces such as iron, steel, glass, and the like. They are also useful in such applications as wire coating and can coating, and the preparation of molded and extruded articles, adhesives, unsupported films, fibers, and the like.

As many apparently widely different embodiments of this invention may be made without departing from the spirit and scope thereof, it is to be understood that the invention is not limited to the specific embodiments thereof except as defined in the appended claims.

The invention claimed is:

1. A copolymer, the polymeric components of which essentially consist of, by weight, 75% to 85% of polymerized vinyl chloride and 15% to 25% of polymerized allyl glycidyl ether, said copolymer having a viscosity, in 30% cyclohexanone at 25° C., between about 1.3 and about 3 poises.

2. A copolymer, the polymeric components of which essentially consist of, by weight, 78% to 82% of polymerized vinyl chloride and 18% to 22% of polymerized allyl glycidyl ether, said copolymer having a viscosity, in 30% cyclohexanone solution at 25° C., between 1.4 and 2 poises.

ELLSWORTH KNOWLTON ELLINGBOE.

REFERENCES CITED

The following references are of record in the file of this patent:

UNITED STATES PATENTS

| Number | Name | Date |
|---|---|---|
| 2,470,324 | Staudinger et al. | May 17, 1949 |